United States Patent [19]
Detriche

[11] Patent Number: 5,503,513
[45] Date of Patent: Apr. 2, 1996

[54] ROBOT ABLE TO MOVE ON FIXED OR MOBILE WORKING STATIONS

[75] Inventor: Jean-Marie Detriche, Noisy le Roi, France

[73] Assignee: Commissariat a L'Energie Atomique, France

[21] Appl. No.: 297,710

[22] Filed: Aug. 29, 1994

Related U.S. Application Data

[63] Continuation of Ser. No. 961,426, Oct. 15, 1992, abandoned.

[30] Foreign Application Priority Data

Oct. 29, 1991 [FR] France .................................. 91 13327

[51] Int. Cl.⁶ .......................................................... B25J 5/06
[52] U.S. Cl. ................................. 414/9; 414/744.5; 901/1
[58] Field of Search ..................... 414/680.9, 735, 414/744.5, 744.1; 901/1; 244/159, 161

[56] References Cited

U.S. PATENT DOCUMENTS

| | | | |
|---|---|---|---|
| 3,272,347 | 9/1966 | Lemelson | 414/735 X |
| 4,295,740 | 10/1981 | Sturges, Jr. | 244/161 X |
| 4,585,388 | 4/1986 | Gossain et al. | 901/1 X |
| 4,664,590 | 5/1987 | Maekawa | 414/744 R |
| 4,932,831 | 6/1990 | White et al. | 901/1 X |
| 5,071,309 | 12/1991 | Herbermann | 414/680 |

FOREIGN PATENT DOCUMENTS

| | | | |
|---|---|---|---|
| 2550984 | 7/1983 | France | B25H 3/00 |
| 211176 | 9/1986 | Japan | 901/1 |

*Primary Examiner*—Donald W. Underwood
*Attorney, Agent, or Firm*—Hayes, Soloway, Hennessey, Grossman & Hage

[57] ABSTRACT

A robotic system for use with at least two working stations and for carrying out tasks, is provided. At least one of the two working stations is mobile. The system according to the present invention comprises a controller for permitting the system to be controlled via a system interface located on the working stations, which interface is connected to an emission/receiver for exchanging information with the robotic system and the interface. A device for supplying energy to the system is provided which is comprised within the working stations. The system is self-propelled to permit autonomous movement between the two stations. Also, included are mechanical and electrical connections for permitting the system to be interchangeably disconnected from one of the working stations and reconnected to another working station.

5 Claims, 4 Drawing Sheets

ROBOT ABLE TO MOVE ON FIXED OR MOBILE WORKING STATIONS

This is a continuation of application(s) Ser. No. 07/961,426 filed on Oct. 15, 1992 now abandoned.

FIELD OF THE INVENTION

The present invention concerns a robot equipping a working station and able to be moved onto other working stations. This robot can be used in many applications concerning industrial robotics or service robotics and, more particularly, in robotics rendering assistance to handicapped persons.

BACKGROUND OF THE INVENTION

As regards the sphere of robotics rendering assistance to handicapped persons, there currently exist robotized systems able to provide almost continuous assistance to handicapped persons confined to a motorized wheelchair. These systems assist these people for carrying a wide variety of tasks, such as those to be effected inside a kitchen or an office.

These robotized systems are known to exist in two different forms: either the robot equips a fixed working station or the robot is situated on the electric wheelchair of the handicapped person concerned, said robot then thus constituting a mobile working station.

If the fixed working station robot has unlimited energetic autonomy, in other words said robot is directly connected to the mains power supply, and if it allows for considerable effectiveness in carrying out particular tasks, it nevertheless does have the drawback of only being able to be used in a restricted environment and thus for a restricted number of tasks. So as to provide the handicapped person with a certain self-sufficiency in his daily life and thus have a large number of tasks to be carried out by the robot, it would be necessary to multiply the number of robots which would thus increase costs significantly.

On the other hand, those robots located on wheelchairs allow for considerable self-sufficiency for the handicapped person, since the robot accompanies him continuously. However, these robots located on wheelchairs do have several drawbacks, especially the one with slight energetic autonomy as the robot is fed by batteries contained on the electric wheelchair. Moreover, it is difficult to instal a robot functioning automatically as the data system able to be installed does not provide sufficient power to store a large number of programs enabling tasks to be carried out by the robot.

In addition, when the robot works with respect to a fixed environment, it needs to locate its references with respect to this environment so as to carry out automatic tasks. This referencing is not simple as the wheelchair has a random positioning with respect to the environment.

SUMMARY OF THE INVENTION

The present invention overcomes these drawbacks by providing a robotic system (known more simply as a robot) able to be moved, at least partly, from one fixed working station onto an armchair, and vice versa.

The terms "wheelchair" and "mobile station" shall be read indifferently throughout the description. Secondly, the notion of "working station" shall also be understood to include both fixed stations and mobile stations.

More precisely, the invention concerns a robotic system equipping a fixed or mobile working station able to carry out tasks and comprising means so as to be able to be controlled from a robotic system/user (or user/robot) interface situated on the mobile working station, this interface itself being connected to emission/receiving means, as well as to means for feeding the robot with energy, each working station comprising energy feeding means. This system is characterized in that it includes displacement means enabling it to be moved, at least partly, from one first working station onto at least one second working station, at least one of these two stations being mobile.

According to one first embodiment, the fixed working station comprises a device for memorizing the tasks to be carried out by the robot (or robotic system) and emission/receiving means so as to exchanging information with the user/robot interface.

According to a second embodiment, each fixed working station is connected by means of a local communication network to a single device for memorizing the tasks to be carried out by the robot, each of said stations comprising emitting/receiving means for exchanging information with the user/robot interface.

According to one third embodiment, the robot includes a device for memorizing the tasks to be executed, as well as emitting/receiving means (E/R) for exchanging information with the interface.

According to one first variant of the invention, the robotic system includes a handling device able to handle objects and a carrier device secured to the handling device able to be moved by said carrier device into a predefined working space, the carrier device able to be moved from the first working station onto the second working station. The displacement means then includes a coupler ensuring mechanical and electrical linkings between the robotic system and one of the working stations.

According to this first variant, each working station includes a seating able to be united with the coupler. This coupler comprises locking means ensuring both locking and provides electric contact of said coupler onto the seating of the working station. In addition, this coupler comprises means to guide the seating of one working station to the seating of another working station. These means to guide the seatings include a cylindrical piece whose extreme portions are slanted inwards.

Advantageously, the seatings of the working stations comprise means for aligning them with one another.

According to one embodiment of the system, the locking means comprise a balance bar or bolt simultaneously ensuring unlocking of the coupler outside the seating of one working station and the locking of the coupler onto the seating of another working station.

According to a second variant of the invention, the robotic system comprises a handling device able to handle objects. It also comprises carrying means able to move the handling device into a predefined working space. Each of the carrier means is secured to one working station, the handling device being moved from one first carrier device onto a second carrier device. The displacement means then comprise a docking support ensuring mechanical and electric links between the handling device and one of the carrying devices. In addition, this docking support comprises locking means providing both a locking and an electric contact of said docking support on the carrying device. Moreover, it comprises at least one motor and one transmission device so as to transmit to the handling device movements allowing the ordered tasks to be carried out.

BRIEF DESCRIPTION OF THE DRAWINGS

Other characteristics and advantages of the invention shall appear more readily from a reading of the following description, given by way of nonrestrictive example, with reference to the accompanying drawings on which.

DETAILED DESCRIPTION OF THE PREFERRED EMBODIMENTS

Figure 1A:
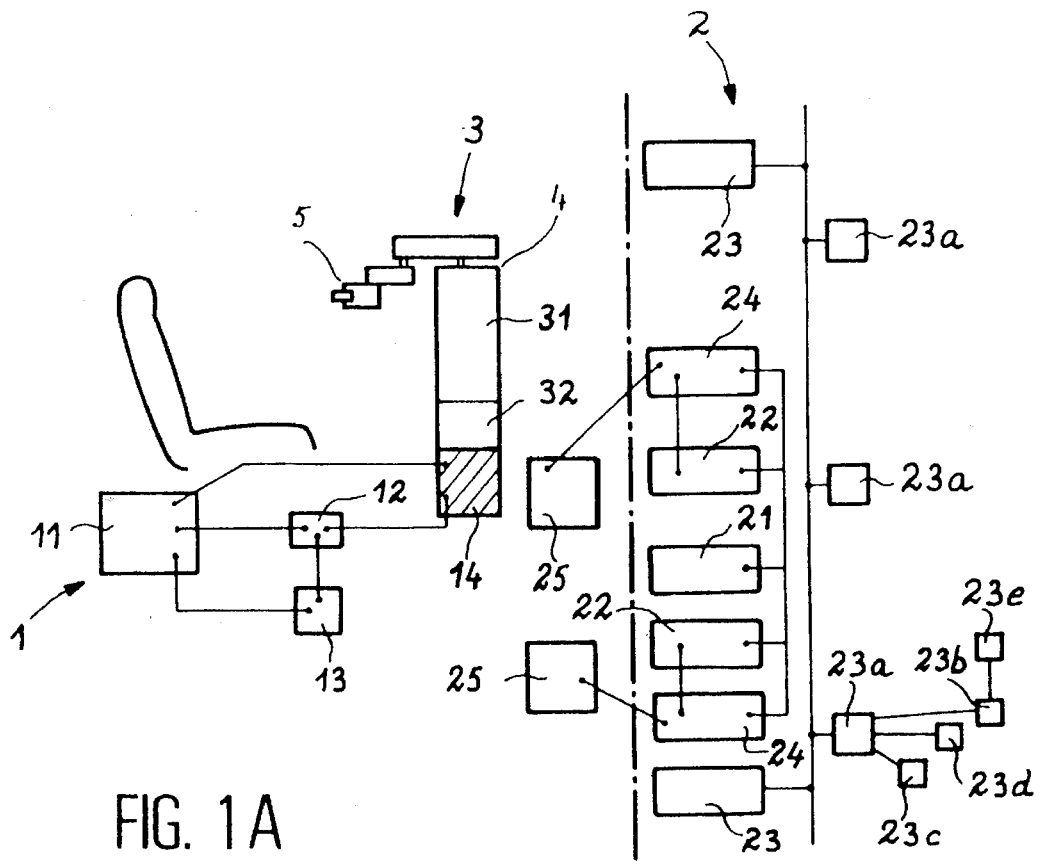
FIG. 1A shows the architecture of a system comprising according to the first variant of the invention a robot positioned on the electric wheelchair and able to be moved onto a fixed working station.
Figure 1B:
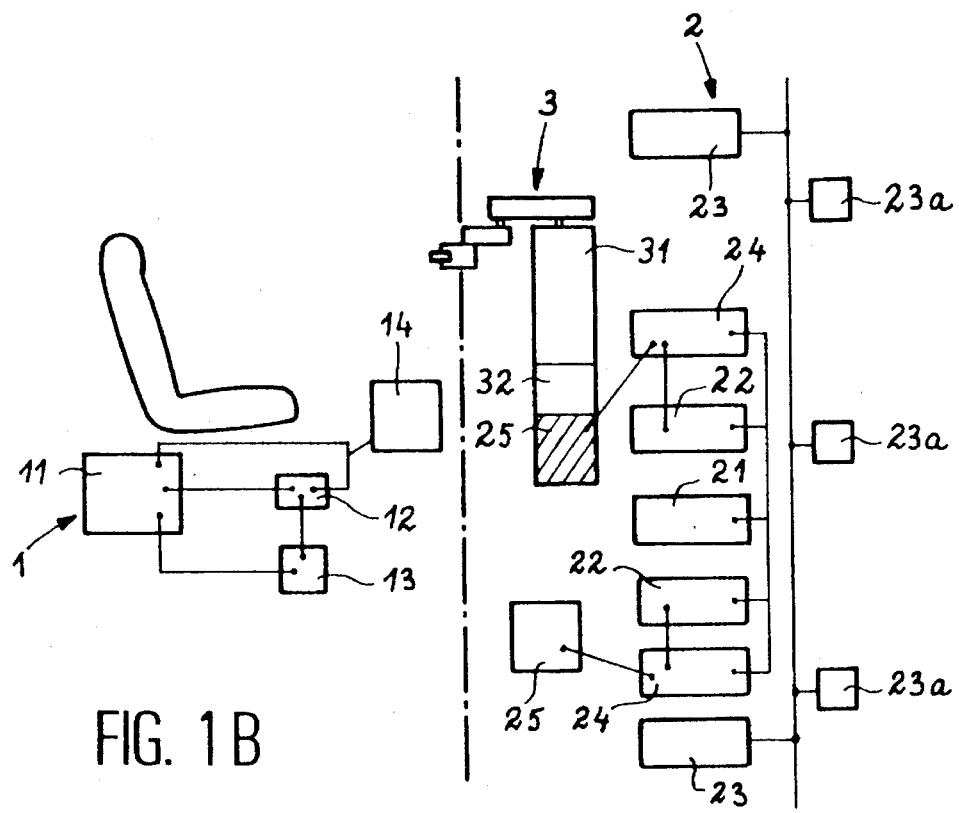
FIG. 1B shows this same architecture of the system when the robot is positioned on the fixed working station.
Figure 2A:
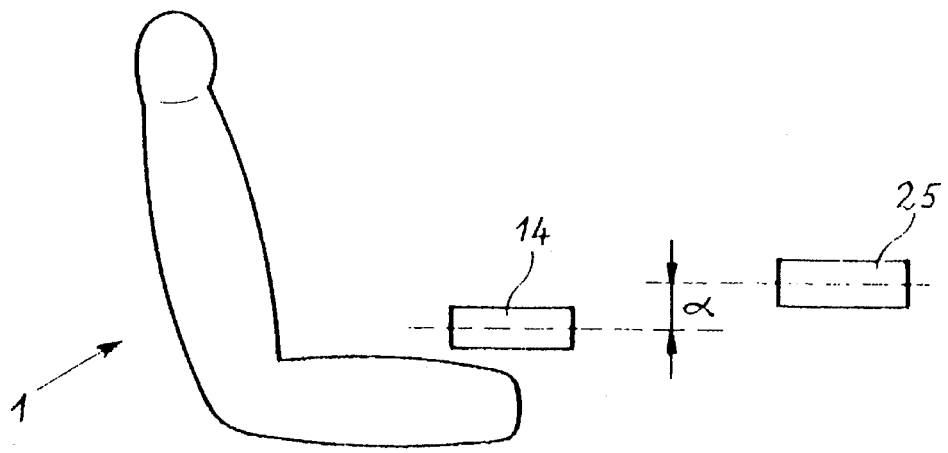
FIG. 2A diagrammatically shows the error which may occur inside the vertical plane when, in the first variant, the armchair and the the fixed working station draw close together so as to move the robot from one working station onto another.

FIGS. 1 to 3 show the robot positioned on the wheelchair according to the first variant of the invention. According to this variant, the robot comprises a carrier device 4 and one handling device 5 mounted permanently on said carrier device. The entire robot is thus moved from one fixed working station onto a mobile working station.

FIG. 1A shows the architecture of a system formed of the electric wheelchair 1, the fixed working station 2 and the robot 3. The left part of the figure shows the electric wheelchair 1 equipped with the installed system and all the elements linked to it, namely a source of clean energy 11, such as batteries, a user/robot interface and an emitter/receiver. The user/robot interface 12 allows the handicapped person to communicate with the robot 3, that is control the manoeuvres the robot 3 is required to make. The link between the user/robot interface 12 and the energy source 11 is a power link, that is physically an electric cable. The same applies to the physical link between the emitter/receiver 13 and the energy source 11, this link also being effected by an electric cable. The figure also shows the means 31 for controlling the robot and a coupler 32, both linked to the robot. The control means 31 are integrated with the robot. The coupler 32 is itself connected to the energy source 11 of the wheelchair and to the user/robot interface 12 by means of a seating 14 secured to the wheelchair. According to one embodiment of the invention, this connection of the coupler 32 to the energy source 11 and the user/robot interface 12, both being linked to the wheelchair 1, may be effected simply by an electric pin (not shown). Connection is effected by means of the seating.

The fixed working station 2 and the elements linked to it are shown on the right portion of the figure. This fixed working station 2 also includes an energy source 21, this energy source being the mains supply. It also includes an emitter/receiver 22 and local receivers 23. The emitter/receiver 22 allows for communication between the emitter/receiver 13 and the robot and thus control of the robot 3 when the latter is located on the fixed working station 2. The local receivers 23 make it possible to control the environment: in fact, the emitter/receiver 13 of the wheelchair 1 is able to act on the environment by means of systems for controlling the environment. A system for controlling the environment comprises one local receiver 23, a controller 23a and items of equipment 23b, 23c, 23d, 23e (for example, a door opening motor), the controller 23a being able to control the equipment 23b to 23e according to the information received by the local receiver 23. The links between the emitter/receiver of the wheelchair 1 and the emitter/receiver 22 of the fixed working station 2 are constituted by a wire-free link, such as an infrared link or radio links.

According to the preferred embodiment of the invention, the fixed working station 2 may also comprise a memory 24 connected to the seating 25 of said station and able to store the programs corresponding to the various tasks the robot 3 needs to carry out automatically. When the robot 3 is installed on the electric wheelchair 1, as shown on FIG. 1A, there is no physical link between the robot 3 and the fixed working station 2. A link exists between the emitter/receiver 13 of the wheelchair 1 and the local receivers 23 of the environmental control system, this link being a wire-free link.

Advantageously, the coupler 32 of the robot is both a mechanical and electric coupler, that is it establishes mechanical links between the robot 3 and the wheelchair 1 and electric links between the energy source 11 and the robot control means 31.

FIG. 1B also shows the architecture of this same system in which the robot is this time positioned on the fixed working station 2. The figure also shows that the links between the actual elements of the wheelchair 1 remain identical to those shown on FIG. 1A. On the other hand, the links via cables between the energy source 11 and the coupler 32 and between the robot/user interface 12 and said coupler 32 no longer exist as the robot 3 is secured to the fixed working station 2. The coupler 32 of the robot 3 is then connected to the fixed working station 2 by means of a seating 25 fixed to said working station, this coupler being connected by electric cables to the memory 24 and thus to the energy source 21 of the fixed working station and to the emitter/receiver 22 of said working station, as well as to the robot control means 31. The fixed working station 2 supporting the robot 3 is in liaison with the wheelchair 1 by means of the emitters/receivers 22 and 13.

FIG. 1B shows the embodiment of the invention in which each fixed working station 2 comprises one memory 24, this embodiment already having been described during the description of FIG. 1A.

However, according to another embodiment of the invention (not shown on the figures), each fixed working station does not have its own memory; an overall memory, connected to each of the fixed stations, includes all the programs corresponding to all the tasks able to be carried out by the robot on all the working stations. Each fixed station searches in the overall memory for the program it needs to carry out.

According to another embodiment (not shown on the figures), the robot has its own memory. According to one variant of this embodiment, it may also comprise an emitter/receiver enabling it to be controlled from the wheelchair. According to another variant of this embodiment, in addition to the memory integrated with the robot, one first additional memory is installed on the wheelchair and a second additional memory is integrated with each fixed working station. Each of these three memories Comprises the programs respectively comprising the tasks proper to the robot and the particular tasks able to be executed by the robot from the wheelchair and the fixed station respectively. Moreover, it is possible, via a local network, to connect the second additional memories of each fixed working station, as well as the fixed seatings of said working stations.

Furthermore, FIGS. 1A and 1B show the embodiment of the invention in which the control means 31 are incorporated with the robot.

According to one preferred embodiment of the invention, these control means 31 comprise first control means placed on the wheelchair and second control means integrated with the fixed working station. The first control means in this instance are connected to the interface 12 and to the seating 14, the direct link between the interface 12 and the seating 14 then being suppressed. The second control means are then connected to the emitter/receiver 22 and to the fixed seating 25.

According to one variant of this latter embodiment, the second control means of each fixed station are connected via a local network.

Furthermore, the two emitters/receivers 13 and 22 linked firstly to the wheelchair and secondly to the fixed working station, that is the emission/receiving means described previously, could of course possibly exist in a different technological form. For example, the means 13 could solely be an emitter and the means 22 solely a receiver.

Secondly, so as to be able to be assembled at another working station, each of the working stations (wheelchair or fixed working station) comprises a seating (14 or 25). The mechanical role of the coupler 32 makes it possible to assemble the seating of the wheelchair with the seating of the fixed working station on which the robot 3 is placed or on which the robot 3 is positioned so as to place it on the wheelchair 1.

Figure 2B:
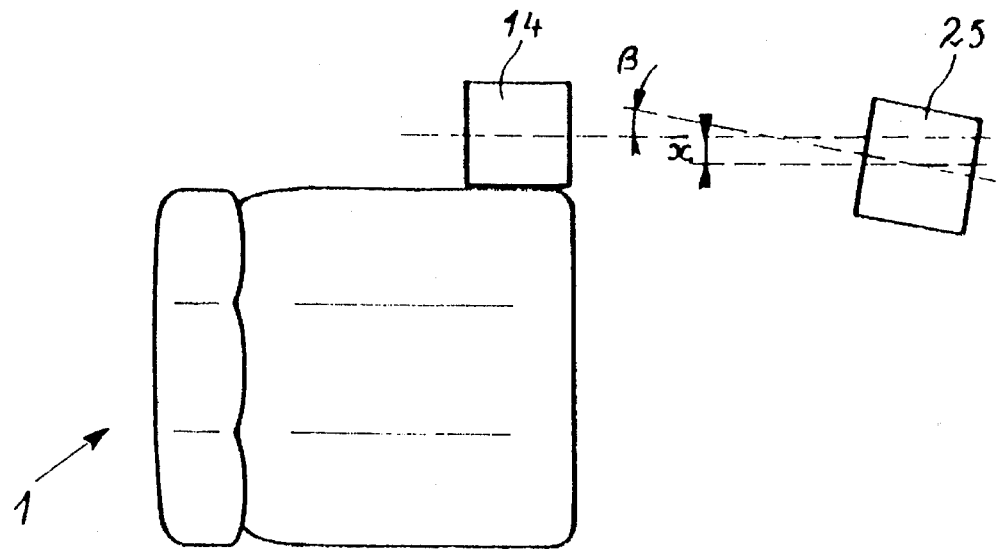
FIG. 2B also shows extremely diagrammatically the error which may occur inside the horizontal plane when the wheelchair and the fixed working station move close to each other.

The top part of the diagram on FIG. 2B shows an error example made inside the horizontal plane, that is an error in orientation β of the fixed seating 25 with respect to the seating 14 of the wheelchair and a lateral offsetting x.

The coupler 32 has a particular shape allowing for coupling of the seating 14 of the wheelchair with the seating 25 of the working station, despite the errors due to imperfections of movements of the wheelchair 1. Thus, the coupler 32 makes it possible to correct the positional and orientation errors inside the vertical and horizontal planes.

We shall assume in this description that guiding of the wheelchair 1 is effected manually. However, it could be effected automatically, for example with the aid of a marking to the ground; in this case, the wheelchair 1 includes a particular adapted technology. In the manual mode, the handicapped person positions his wheelchair 1 with respect to the seating 25 of the fixed working station. The coupler 32 then allows for an accurate coupling of the seating 14 of the wheelchair with the seating 25 of the working station.

To this end, the coupler 32 shown on FIGS. 3A, 3B, 3C, 3D and 3E, is made up of one cylindrical piece 33 whose extreme portions 33a are slanted towards the inside of the cylindrical piece 33. This gives the cylindrical piece 33 a V-shaped entrance in which the seatings 14 and 25 of the wheelchair and of the fixed working station are housed on both sides.

In fact, the seatings 14 and 25 have particular shapes allowing for a simple nesting of said seatings in the coupler 32. Each base actually includes at its free extremity, that is the non-fixed extremity, a rod-shaped pin 25a able to be nested in the hollow portion of the cylindrical piece 33 of the coupler 32. Moreover, one portion 25b of the seating is chamfered so as to be nested inside the V-shaped portion 33a of said cylindrical piece 33 of the coupler 32.

The seating 14 further includes suspension means (not shown) allowing for vertical play between the seating 14 in question and its support, namely the wheelchair 1. In fact, so as to put right the error possibly made inside the vertical plane, spring type suspension means are situated between the seating and the wheelchair. These suspension means enable the seating/coupler unit to be offset vertically towards the top or bottom according to specific requirements by a slight distance with respect to the working station.

In the embodiment shown on FIG. 3, only the seating 14 of the wheelchair includes these suspension means. However, this not preclude each seating having its own suspension means.

The coupler 32 also includes locking means 34. These locking means may be constituted by a balance bolt. This bolt simultaneously makes it possible to lock the coupler 32 onto the seating 14 and unlock said coupler 32 of the other seating 25, or vice versa. When the coupler 32 is locked on one of the seatings 14 or 25, the electric contact is established between the robot and the fixed or mobile working station corresponding to the seating on which it is locked.

The series of FIGS. 3A, 3B, 3C, 3D and 3E show the various stages followed by the robot when it is moved from one fixed station to one mobile working station or vice versa, namely from one mobile working station to one fixed working station.

Figure 3A:
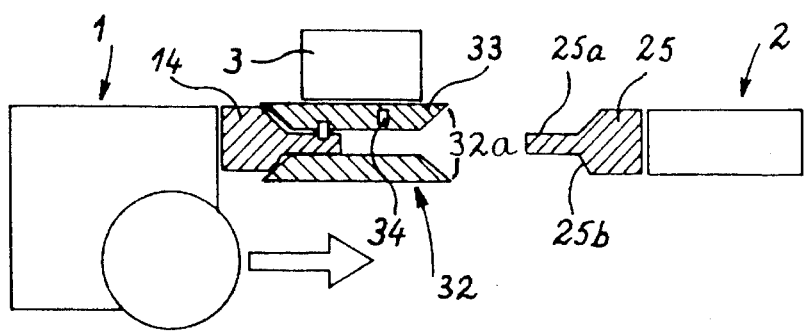
FIGS. 3A, 3B, 3C, 3D and 3E diagrammatically represent the various stages followed by the robot when it is moved from the electric armchair onto the fixed working station.

FIG. 3A shows the robot 3 when it is positioned on the wheelchair 1.

Figure 3B:
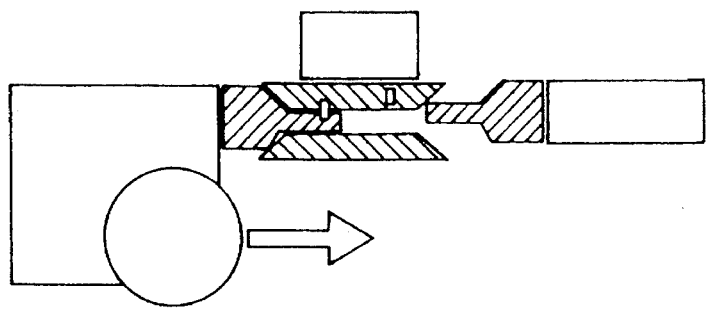

FIG. 3B shows the wheelchair 1 drawing towards the fixed working station 2 with the approach of the pin 25a of the seating 25 of the fixed working station onto the coupler 32. The drawing shows that the seating 25 of the fixed working station is not aligned vertically on the seating 14 of the mobile working station, namely the wheelchair. The contact of the coupler 32, currently positioned on the wheelchair, shall, along with the seating 25 of the fixed working station, enable the seating 14 of the wheelchair to raise up by means of the suspension means so that the seating unit of the wheelchair/coupler is aligned vertically with the seating of the fixed working station. As long as the pin 25a of the seating 25 of the fixed working station is in contact with the slanted portion 33a of the cylindrical piece 33 of the coupler, the seating unit of the wheelchair/coupler lifts until the pin 25a of the seating 25 of the fixed working station is nested inside the hollow portion of the cylindrical piece 33 of the coupler.

Figure 3C:
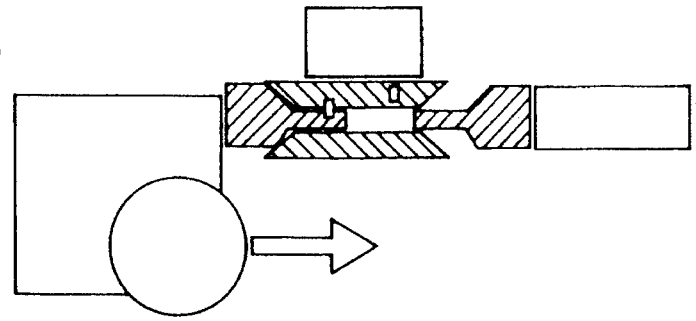

FIG. 3C shows the pin 25a of the seating of the fixed working station nested inside the hollow portion of the cylindrical piece of the coupler. The wheelchair thus continues to move forward until the slanted portion 33a of the cylindrical piece 33 comes into contact with the chamfered portions 25b of the seating 25.

Figure 3D:
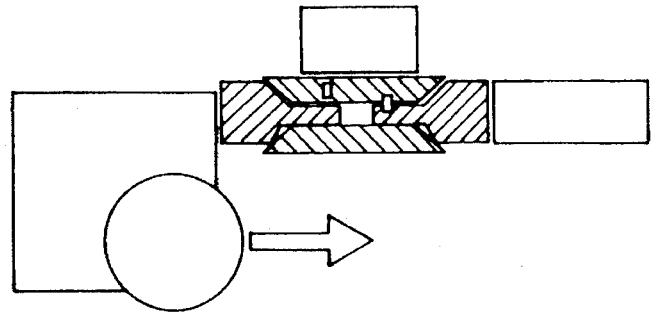

FIG. 3D shows that the seating 25 of the fixed working station is fully nested inside the coupler 32. The balance bolt 34 is inverted and driven into the seating 25 of the fixed working station, thus freeing the seating 14 of the wheelchair.

Figure 3E:
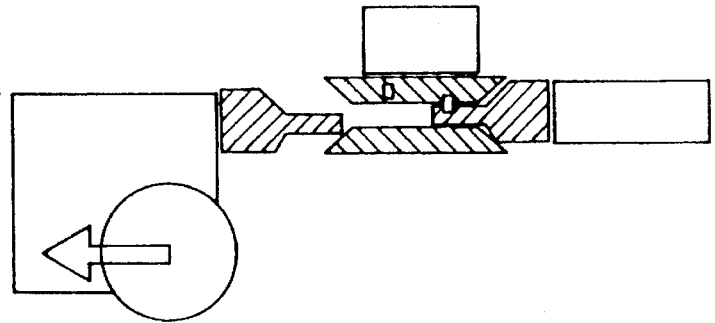

On FIG. 3E where the balance bolt 34 has secured the robot 3 to the fixed working station 2, the electric contact between the control means 31 and said working station is established, also by virtue of the coupler 32. Moreover, this figure also shows that once the seating of the wheelchair has been unlocked, the wheelchair may then be moved back.

Figure 4:
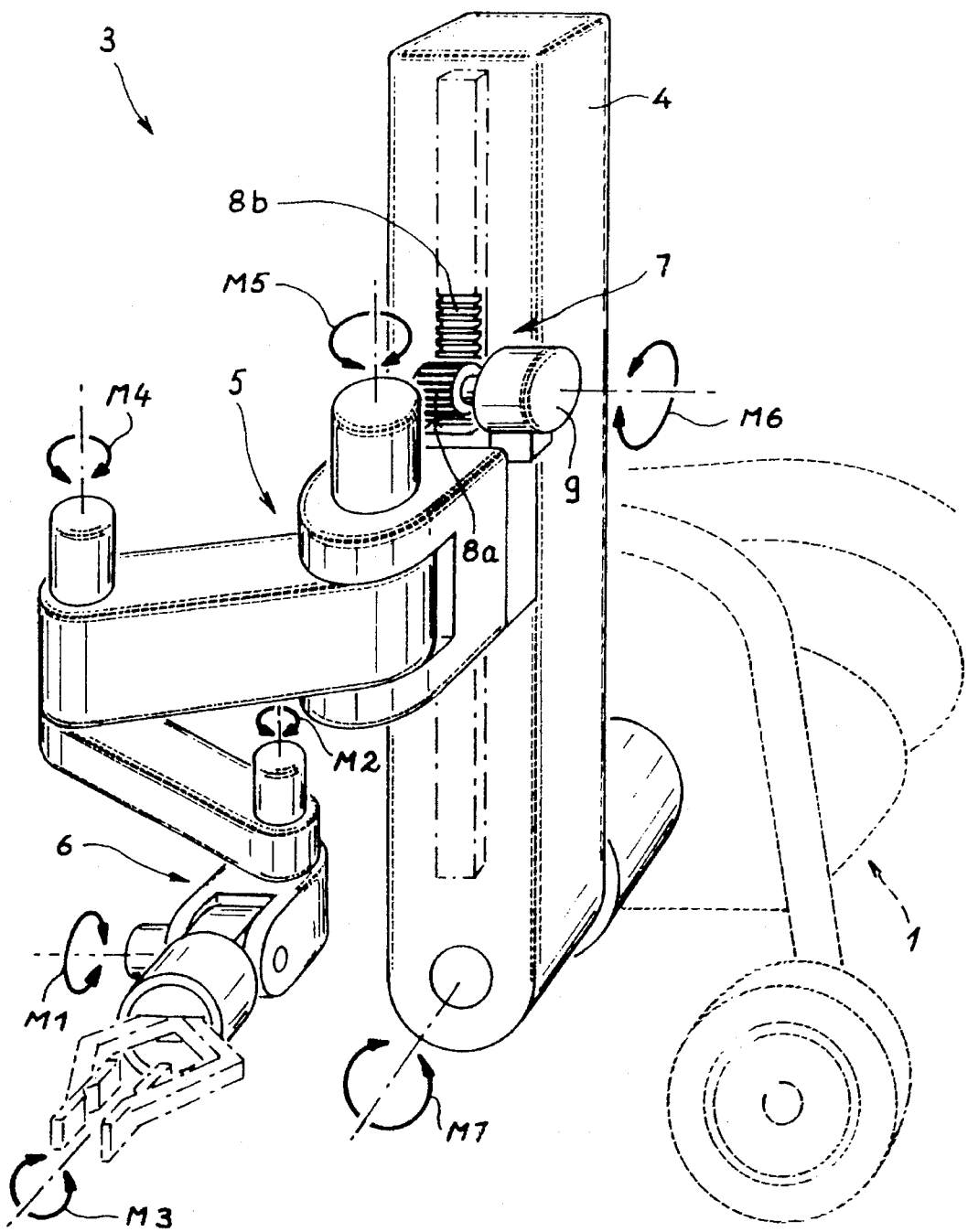
FIG. 4 diagrammatically shows the robot located on the wheelchair in accordance with the second embodiment variant of the invention according to which the handling device is moved by a carrying device onto another carrying device.

FIG. 4 shows the robot positioned on the wheelchair 1 according to the second variant of the invention. According to this variant, the robot 3 comprises a handling device 5 mounted and able to move on the carrying device 4 of said robot.

The general architecture of the system formed by the electric wheelchair, the robot and the fixed working stations described in FIGS. 1A and 1B is roughly identical for this second variant; only the means for moving the robot from one working station onto another station differ from the first variant. This architecture shall not be described again, apart from mentioning in particular the robot control means, the user/robot interface, the electric connections, the emitter/receiver communications, the links at local networks, etc.

In fact, numerous types of robots comprise handling devices roughly identical to one another. For certain applications, it is also possible to secure to each fixed or mobile working station one of said carrier devices 4 on which the handling device 5 is mounted according to the tasks to be carried out. This handling device 5 comprises a "handle" type joint 6, that is one comprising three degrees of rotational mobility M4 and M5. Such a handling device 5 thus allows for the handling and orientation of various objects in space.

The number of degrees of mobility of the carrier device 4 depends on the type of handling device used and the tasks to be carried out.

The carrier device 4 mounted on the wheelchair may comprise a vertical mobility M6 allowing for a vertical movement of the handling device 5 and a rotation mobility M7 allowing for a movement of the handling device inside a horizontal plane. In particular, this carrier device allows the robot 3 to be lowered so as to pick up on object which has fallen to the ground.

Each carrier device 4 is thus mounted permanently on a fixed or mobile working station. Thus, only the handling device 5 is moved by a carrier device positioned on a fixed working station towards the carrier device positioned on the wheelchair, or vice versa.

The handling device 5 is mounted so as to be able to move on the carrier device 4 with the aid of a docking support 7. In fact, the handling device 5 comprises this docking support 7 which itself includes locking means (not shown on FIG. 4) roughly identical to the locking means 34 described in the first variant of the invention. These locking means ensure both locking and an electric contact of the docking support 7 on the carrier device 4.

This docking support 7 further comprises movement transmission means including a toothed wheel 8a able to be nested inside the rack 8b of the carrier device 4. It further comprises a drive motor 9 ensuring the driving of the toothed wheel 8a along the rack 8b.

The handling device 5 may thus carry out the movements making it possible for the user to carry out the tasks required from the interface described in the previous figures. According to another embodiment of the docking support 7, the transmission means may consist of a plurality of pinions suitable for being geared on pinions of the carrier device.

The entire preceding description is based on the coupling of one mobile working station, namely an electric wheelchair, and one fixed working station, it nevertheless being possible to couple one mobile working station with a large number of fixed working stations, the wheelchair moving from one to another so as, according to the first variant, to look for and rest the robot or, according to the second variant, the handling device.

According to one preferred embodiment of the invention, it is possible to organize together the various fixed working stations according to a local network. The information to be transmitted from one working station to another working station is then transmitted in the form of signals by the local network.

According to one simplified embodiment of the invention, the emitter/receiver 13 may be a single emitter. In this case, the means 22 are solely receivers. The linkage between the wheelchair and the local receivers are then monodirectional.

The present invention shows the example of a wheelchair of a handicapped person. The mobile seating as described may of course be adapted to other types of self-guided or remote-controlled vehicles.

What is claimed is:

1. A robotic system for carrying out tasks, and comprising:

a. at least two working stations, at least one of said two working stations being a mobile station having means for moving said mobile station along a desired travel path, and a manipulating robotic arm for being connected to and carried by one of said two working stations;

b. control means for generating control signals for controlling said robotic arm, said control means being controlled by a user/robot interface included in said mobile station, said user interface being used to control said robotic arm when said robotic arm is connected to said mobile station and used to control said robotic arm via emitter/receiver means also included in said mobile station when said robotic arm is connected to the other of said stations;

c. means for supplying energy to said system, said means for supplying energy being included within each said working station; and d. displacement means for permitting said robotic arm to be interchangeably disconnectable from said one station and reconnectable to the other of said stations, said displacement means including a coupler means mounted to said robotic arm and at least two seating means, each of said working stations having one of said seating means mounted thereon, each said seating means including an elongate pin extending from a chamfered portion, said coupler means including a hollow cylindrical piece having two entrances for receiving the pins of said two seating means, said entrances including respective slanted portions for being nested with said chamfered portions of said seating means when said pins of said seating means are fully received in said entrances, said coupler means also including a balance bolt means for engaging the pin of the seating means of the station to which said robotic arm is to be connected and for simultaneously disengaging the pin of the seating means of the station to which said robotic arm is to be disconnected whereby to permit said robotic arm to be disconnected from said one station and connected to said other station.

2. A robotic system according to claim 1, wherein said at least two working stations comprise a fixed station which includes a memory for storing the tasks to be carried out by the robot and also includes emitter/receiver means for transmitting said tasks to said robot.

3. A robotic system according to claim 2, and further comprising a memory for storing the tasks to be carried out located at said fixed station.

4. A robotic system according to claim 1, wherein said balance bolt means also permits electrical connection of the robotic arm to the workstation to which said robotic arm is intended to be connected.

5. A robotic system according to claim 1, wherein said robotic arm comprises handling means for handling objects, and carrier means secured to the handling means for moving the handling means within a predefined working space, and also wherein the carrier means is connected to the displacement means and permits the robotic arm to be interchangeable from said one working station to said another working station.

* * * * *